(12) United States Patent
Zoernack

(10) Patent No.: US 6,647,007 B1
(45) Date of Patent: Nov. 11, 2003

(54) METHOD FOR TRANSMISSION OF DATA INCLUDING SIGNALING THE NECESSITY OF A SECOND COMMUNICATIONS PATH TO A NETWORK CONTROL SYSTEM

(75) Inventor: Alexander Zoernack, Unterschleissheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/306,174

(22) Filed: May 6, 1999

(30) Foreign Application Priority Data

| May 6, 1998 | (DE) | 198 20 222 |
| Feb. 10, 1999 | (DE) | 199 05 509 |

(51) Int. Cl.⁷ .................. H04L 12/66; G06F 15/173
(52) U.S. Cl. .................................. 370/352; 709/239
(58) Field of Search ................... 370/237, 238, 370/352, 468; 709/235, 238, 239

(56) References Cited

U.S. PATENT DOCUMENTS

| 5,732,078 A | * | 3/1998 | Arango | 370/355 |
| 5,995,606 A | * | 11/1999 | Civanlar et al. | 379/207.13 |
| 6,064,653 A | * | 5/2000 | Farris | 370/237 |
| 6,104,701 A | * | 8/2000 | Avargues et al. | 370/352 |
| 6,154,445 A | * | 11/2000 | Farris et al. | 370/237 |
| 6,240,462 B1 | * | 5/2001 | Agraharam et al. | 709/238 |
| 6,310,873 B1 | * | 10/2001 | Rainis et al. | 370/238 |
| 6,349,096 B1 | * | 2/2002 | Liu et al. | 370/238 |
| 6,449,259 B1 | * | 9/2002 | Allain et al. | 370/253 |

FOREIGN PATENT DOCUMENTS

| EP | 1014667 A2 * | 6/2000 | H04M/7/00 |

* cited by examiner

Primary Examiner—Melvin Marcelo
Assistant Examiner—Nhat Do
(74) Attorney, Agent, or Firm—Laurence A. Greenberg; Werner H. Stemer; Ralph E. Locher

(57) ABSTRACT

Data are transmitted between communications subscribers over a communications network, in particular a packet-oriented network such as the Internet. On recognizing that the bandwidth of the connection is not sufficient for a given transmission, a user may temporarily use an alternate path while using a network access. In addition, a flexible method of charging for the alternate path is possible, which method is controlled independently of the charging procedure for the first data path.

8 Claims, 2 Drawing Sheets

METHOD FOR TRANSMISSION OF DATA INCLUDING SIGNALING THE NECESSITY OF A SECOND COMMUNICATIONS PATH TO A NETWORK CONTROL SYSTEM

BACKGROUND OF THE INVENTION

Field of the Invention

The invention pertains to a method for the transmission of data between two communications subscribers over a communications network, in particular a packet-switched network such as the Internet. Each of the communications subscribers is connected to the communications network over a network access point (also known as "point of presence" or POP).

Charges are billed by the supplier of the network access point, who can provide the user with the access services to the communications network according to different tariff schemes, e.g. according to the duration of the network access or to the amount of data transmitted.

The user may also incur additional costs for the connection to the network access point, for example if access is had over a public switched telephone network.

During a session the respective user can establish contact with different data sources (Internet application providers) over the communications network, whereby an arbitrary communications path through the communications network is selected for the data packets. It can happen, however, that the quality of the communications path is inadequate for the data and services provided by the data source.

In order to solve this problem it has hitherto been necessary for one of the communications subscribers (for example the data provider or the service provider) to set up an additional connection. It is not possible to influence the charging information.

Furthermore, it is generally necessary for the end user to acquire additional hardware and software.

SUMMARY OF THE INVENTION

It is accordingly an object of the invention to provide a data transmission method, which overcomes the above-mentioned disadvantages of the heretofore-known devices and methods of this general type and which provides the user with the possibility of temporarily using an alternate path during the use of a network access, with avoidance of the above disadvantages. It is a further object of the invention to provide a flexible method of charging for the alternate path that is controlled independently of the charging for the first data path.

With the foregoing and other objects in view there is provided, in accordance with the invention, a method of transmitting data, which comprises:

establishing a first communications path via a first communications network between a first communications subscriber connected to a first network access point, and a second communications subscriber connected to a second network access point;

signaling a need for a second communications path with one of the network subscribers, and, in response, establishing a second communications path between the first communications subscriber and the second communications subscriber with a network control system; and transmitting further data via the second communications path.

The implementation of the invention is based on the existence of a network control system which accepts and processes requests from the communications subscribers. If one of the communications subscribers establishes the need for an alternate path, it reports this to the network control system. As a minimum, the network system requires information as to which network access points should be connected by the alternate path and then takes further action.

In accordance with an added feature of the invention, the second communications path is established in a communications network different from the first communications network. The invention is especially advantageous if the alternate path initiated by the network control system uses a second communications network which is different from the communications network through which the original communications path runs. It is then possible, for example, to set up data connections with a very high transmission rate if the first communications network is capable of only a very low data throughput for reasons of high utilization of its capacity.

In accordance with an additional feature of the invention, the signaling step is performed when the data transmission requires a different bandwidth from a bandwidth of the first communications path. One conceivable application of the invention is the transmission of very large amounts of data within a short time. This is the case, for example, for video conferences or other transmissions of multimedia data such as video recordings. One rational criterion for requesting an alternate connection is therefore the expected bandwidth necessary for the data transmission. In this respect the current utilization of the capacity of the first communications network can also be used for evaluation.

In accordance with another feature of the invention, usage parameters are set up for a use of the second communications path between the first communications subscriber and the second communications subscriber which are different from use parameters for the first communications path. By way of example, the usage parameters concern charges.

The use of different usage parameters for the second communications link is particularly useful if the second communications path leads through a second communications network. This is especially relevant for the charging information. Since the user may already pay for the first communications path, there may be the requirement that the additional costs incurred through the second communications path be met by the provider of data or services. It is also possible for the charges to be shared arbitrarily between the communications subscribers.

In accordance with a further feature of the invention, an authorization for setting up the second connection is checked prior to establishing the second communications path between the first communications subscriber and the second communications subscriber. Since setting up a second communications link is typically associated with additional costs, it is of advantage if undesired use of a second communications link can be prevented. In addition to the data transferred to it in association with a request, the network control system also has available further stored subscriber information. This enables the network control system to determine whether the request to set up a connection is permissible, i.e. the user is included in a list of authorized subscribers ("White List"), or is not included in a list of subscribers specifically excluded from the process ("Black List").

At least two possible processes are conceivable:

In accordance with again an added feature of the invention, a need for the second communication path is determined in response to the request signal, and a message is subsequently sent with a network control system to a switching network element, and a connection is set up for the second communications path with the switching network element between the first communications subscriber and the second communications subscriber. In other words, after the need of one of the communications subscribers has been determined, this is passed on to a network control system. This requests a switching network element in the second communications network to set up a connection between the communications subscriber submitting the request and the second communications subscriber.

Alternatively, an access code is allocated with a network control system to the network access point of the second communications subscriber or to the second communications subscriber itself;

informing the first communications subscriber or the network access point connected to the first communications subscriber of the access code; and setting up a connection via the access code with the first communications subscriber or the network access point of the first communications subscriber.

In other words, after the need of one of the communications subscribers has been determined, this is passed on to a network control system. This then allocates a new number for the second communications subscriber and clears the number. This can also have different parameter settings from the first communications path, for example the charging method. This number is then communicated to the first communications subscriber, who can then open a second communications path by dialing this number.

In accordance with a concomitant feature of the invention, the access code is allocated temporarily and the access code is rendered unavailable for further use after the connection has been terminated. In this way misuse of the above mechanism can be prevented.

Other features which are considered as characteristic for the invention are set forth in the appended claims.

Although the invention is illustrated and described herein as embodied in method for the transmission of data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
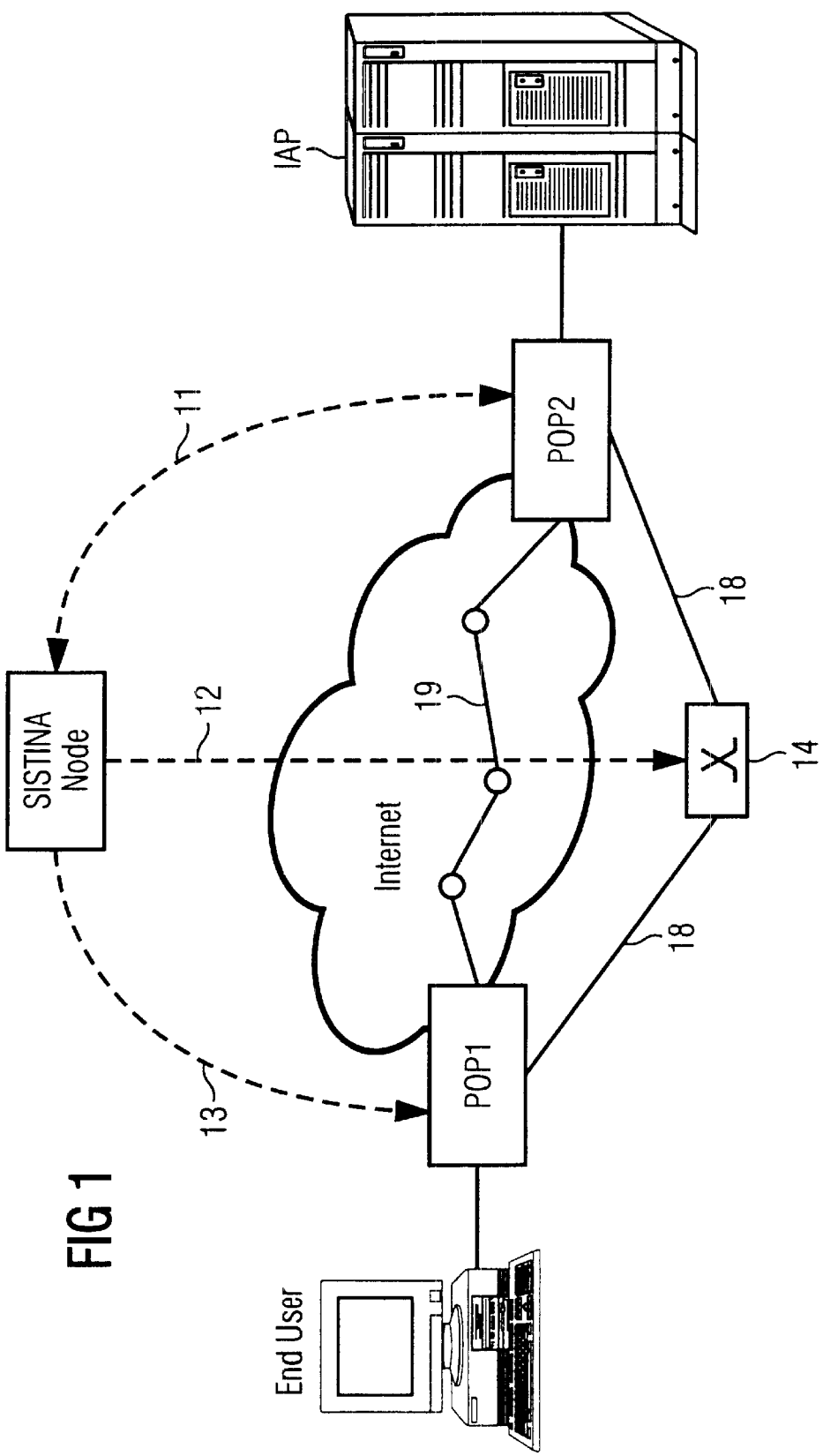
FIG. 1 is a schematic illustrating a procedure in which the second communications path is set up from one switching node to both communications subscribers.

Referring now to the figures of the drawing in detail and first, particularly, to FIG. 1 thereof, there is seen a first possible way of realizing the method according to the invention. A first communications subscriber (End User) on the left sets up a connection to a second communications subscriber IAP (Internet Application Provider) on the right. This takes place through establishment of a link to a first network access point POP1, over a communications path 19 through the first communications network Internet, and a second network access point POP2.

This communications path carries the entire communications (data packets and/or line-switched).

When a communications subscriber recognizes the need for a second communications path it sends a message 11 to the network control system SISTINA (Solutions for Integrated services a la TINA). This can occur, for example, if End User requests the transmission of large amounts of data, e.g. multimedia data, a video conference or similar. In this case the currently requested data transmission capacity is normally inadequate.

The message 11 can also be used to request the network control system SISTINA to check on the basis of its known data concerning the two communications partners, whether setting up such a second link is permissible and which parameters must be used.

The network control system SISTINA then sends a request 12 to a switching center 14, which in this case is located in a different network from the first communications network, to set up a connection between the first communications subscriber End User and the second communications subscriber IAP.

If necessary the first communications subscriber can be provided with the necessary alternate routing information 13.

The switching center 14 then sets up the required data path 18 to the two communications subscribers.

Figure 2:
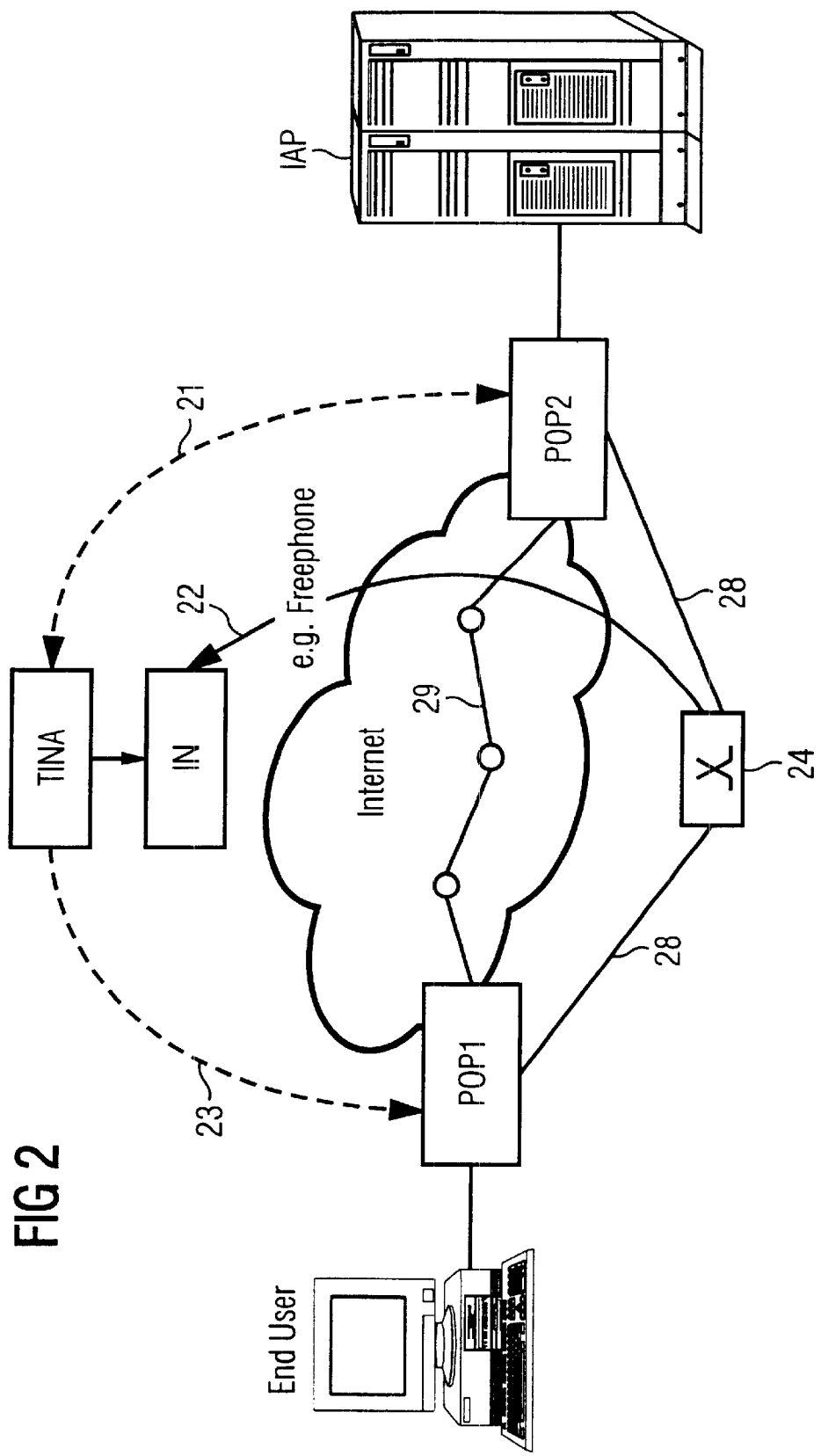
FIG. 2 is a similar schematic of a realization by means of temporary installation of a "toll-free" (for the user) number through a network control system.

Referring now to FIG. 2, there is illustrated a further possible way of realizing the procedure according to the invention.

The initial situation is identical to that shown in FIG. 1.

The first communications subscriber (End User) on the left sets up a connection to the second communications subscriber IAP (Internet application provider) on the right. This takes place through establishment of a link to a first network access point POP1, over a communications path 29 through the first communications network Internet, and a second network access point POP2.

This communication path carries the entire communications (data packets and/or line-switched).

When a communications subscriber recognizes the need for a second communications path it sends a message 21 to the network control system TINA (Telecommunication Intelligent Network Architecture). As in the previous example, this can also initiate a prior check of the two communications subscribers and the permissibility of setting up a further connection.

In response to an allowable request, a temporary access code for the second communications subscriber is allocated and/or cleared by IN (Intelligent Network) and notified:

to the first communications partner POP1, 23, in order to inform it of the new access code; and in a reply to the second communications partner POP2, 21.

The first communications partner can now dial the access code and the switching center 24 sets up the second data path 28. On receipt of the request for the connection it can also send an inquiry 22 to the network control system regarding the destination address, charging details, etc. After the connection has been terminated the network control system can make the number involved unavailable for use once again.

This variant is necessary if the connection as illustrated in FIG. 1 cannot be set up between POP1 and POP2 by the switching node 24 involved.

One possibility for realization of the central network control system lies in the intelligent network architecture which is currently used above all in the fixed and mobile network sector. That architecture is known to those of skill in the art from the publications of the ITU Q.1200 ff (ITU=International Telecommunications Union). The application of that architecture to other communications and data networks is conceivable.

I claim:

1. A method of transmitting data, which comprises:

establishing a first communications path via a first communications network between a first communications subscriber connected to a first network access point, and a second communications subscriber connected to a second network access point;

signaling a need for a second communications path to a network control system with one of the network subscribers, responsively requesting a switching network element in a second communications network to establish the second communications path between the first communications subscriber and the second communications subscriber with the network control system, and establishing the second communications path;

upon determining a need for the second communications path:

allocating an access code with the network control system to the network access point of the second communications subscriber or to the second communications subscriber itself;

informing the first communications subscriber or the network access point connected to the first communications subscriber of the access code; and setting up a connection via the access code with the first communications subscriber or the network access point of the first communications subscriber; and transmitting further data via the second communications path.

2. The method according to claim 1, wherein the second communications path is established in a communications network different from the first communications network.

3. The method according to claim 1, wherein the signaling step is performed when the data transmission requires a different bandwidth from a bandwidth of the first communications path.

4. The method according to claim 1, which comprises setting usage parameters for a use of the second communications path between the first communications subscriber and the second communications subscriber which are different from use parameters for the first communications path.

5. The method according to claim 4, wherein the usage parameters concern charges.

6. The method according to claim 1, which comprises, prior to establishing the second communications path between the first communications subscriber and the second communications subscriber, checking an authorization for setting up the second connection.

7. The method according to claim 1, which comprises determining the need for the second communication path, in response to the signaling step.

8. The method according to claim 1, wherein the allocating step comprises allocating the access code temporarily and rendering the access code unavailable for further use after the connection has been terminated.

* * * * *